Jan. 12, 1943.  G. E. MUMA ET AL  2,307,850
METHOD AND APPARATUS FOR DRAINING WATER FROM
INSULATION OF REFRIGERATED TRUCK BODIES
Filed Oct. 4, 1940  2 Sheets-Sheet 1
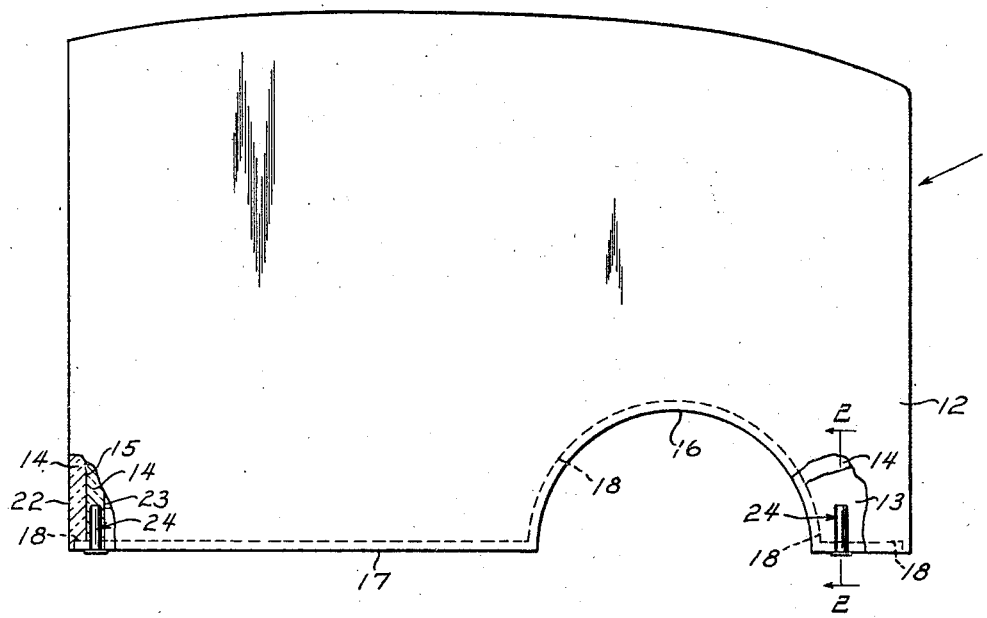
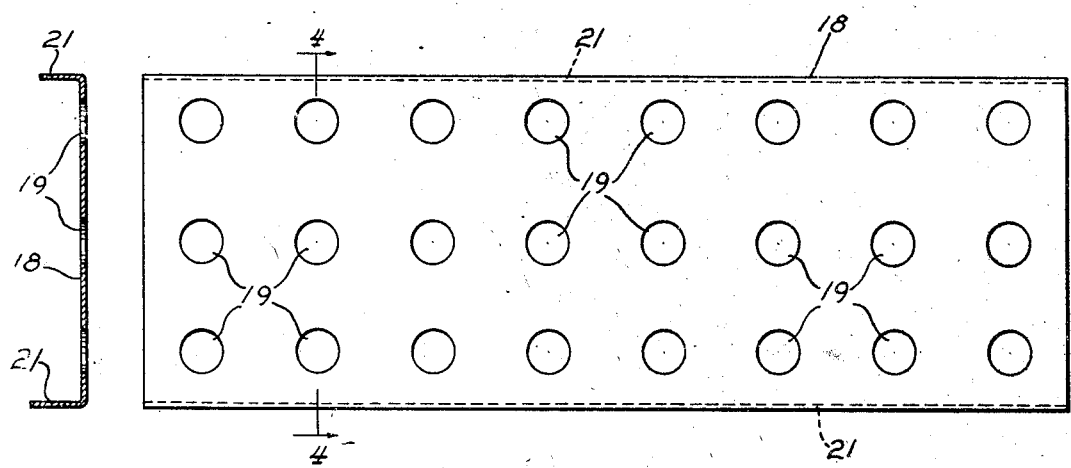
Inventor
Leonel A. DeMore
George E. Muma
By Strauch & Hoffman
Attorneys

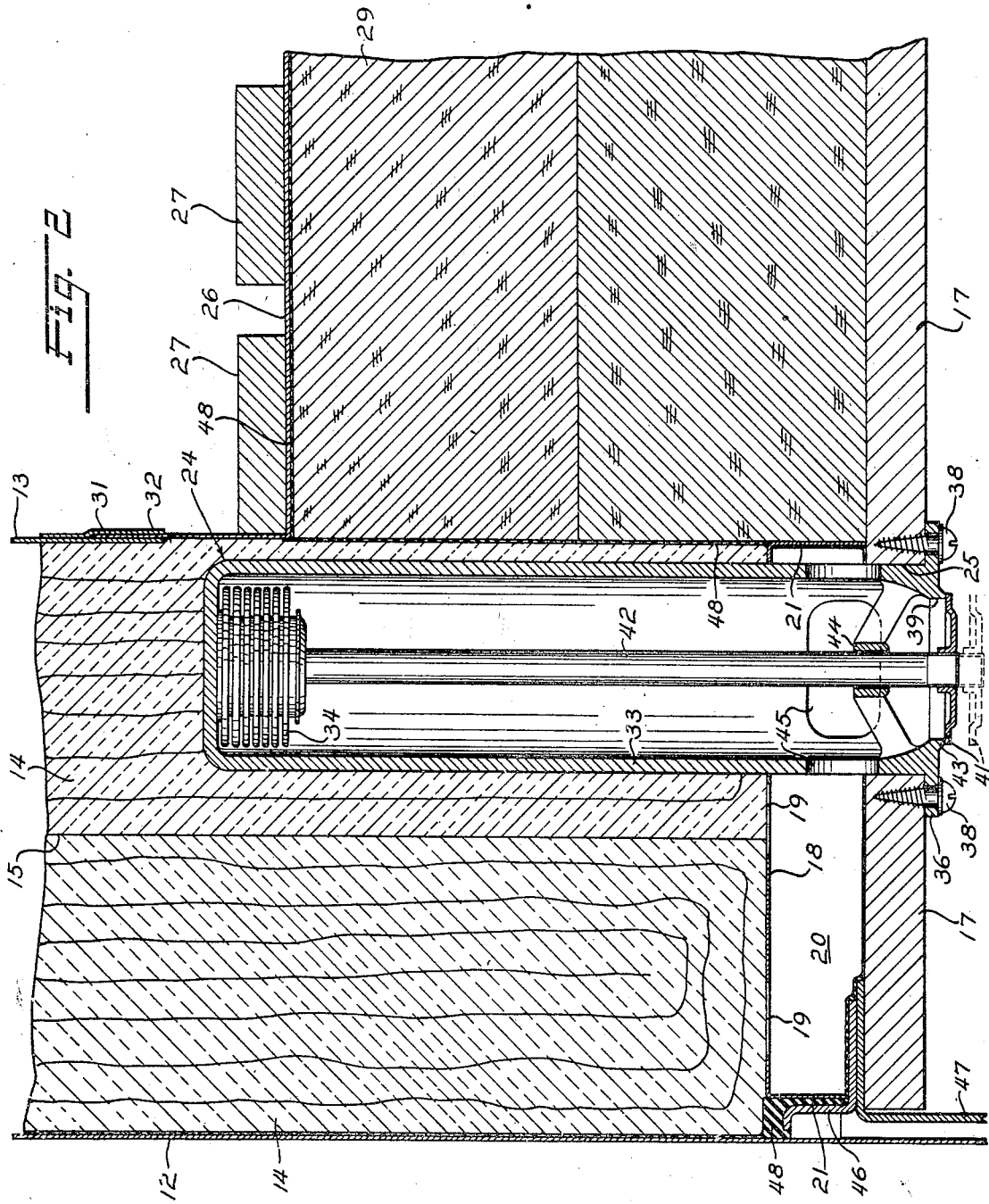

Patented Jan. 12, 1943

2,307,850

UNITED STATES PATENT OFFICE 2,307,850

METHOD AND APPARATUS FOR DRAINING WATER FROM INSULATION OF REFRIGERATED TRUCK BODIES

George E. Muma, Detroit, Mich., and Leonel A. De More, Chicago, Ill., assignors to Divco-Twin Truck Company, Detroit, Mich., a corporation of Michigan Application October 4, 1940, Serial No. 359,796

21 Claims. (Cl. 62—89)

This invention relates to refrigerators, of the type having spaced outer walls forming an insulation space, particularly to refrigerated truck bodies having spaced walls filled with insulation material to prevent the transmission of heat to the interior of the body.

Refrigerated housings or structures are usually constructed with surrounding spaced outer walls. The spaces between the spaced outer walls are generally filled with an insulating material of a porous or fibrous nature, containing within it a large number of air spaces or cells. The housings are generally of rectangular shape and it has not been found commercially feasible to perfectly seal the insulating material against the infiltration of air caused by atmospheric changes in temperature and pressure. In these refrigerated structures the inner wall is cold and the outer wall is generally at the same temperature as the atmosphere. Air which filters into the spaces or interstices in the insulating material has contained therein a certain amount of water vapor. This water vapor carried by the infiltering air into the air spaces adjacent the cold wall of the housing is condensed within these interstices of the insulating material. Depending on the temperature in the insulation material, this condensed water vapor may subsequently become frozen in the insulation adjacent the cold wall. From time to time as atmospheric changes occur and the temperature within the refrigerated housing changes due to operating conditions, this water will flow downwards due to the force of gravity and will collect in the lower part of the space between the walls or in the insulation between the spaced walls. It is preferred not to allow this water to accumulate at this point because most insulating material will be decomposed within a period of time when subjected to these conditions. Furthermore as the air spaces in the insulation become filled with water a great proportion of its insulating efficiency is lost, since water is a better heat transfer medium than air. Various means have been adopted to prevent the formation of water within the insulation material by drying the air which passes into it. In other devices the air is allowed to flow in and out of the insulated space without treatment but means are provided to drain the water from within the space after it has condensed therein. If the bottom of the insulation is continually open to the atmosphere for draining the water therefrom then the flow of atmospheric air into and out of the insulation would be unrestricted. In order to prevent this, the openings which are provided for draining this water have previously been provided with valves, such as plug valves or closures which had to be manually removed in order to discharge the water. In certain types of structures, especially in refrigerated truck bodies these plugs which let out the water when they are removed, are generally in an inaccessible position and the operators will sometimes fail to replace them after the water has drained or will fail to remove them to drain the water when they should. My invention relates to the problem of disposing of this water after it has condensed within the insulation and drained to the bottom thereof and includes the use of automatically operated valves for this purpose.

In the favored embodiment the valves are operated by thermostats responsive to the temperature inside the refrigerated truck body. When the truck is out of use, or if the cooling pipes in the truck are being defrosted, the temperature within the body will rise. According to my invention, when the temperature within the truck rises, a thermostat which is responsive to this temperature will actuate the valves controlling the water discharge opening. Preferably the thermostat is located within the insulation itself adjacent the cold wall so that the thermostat is subject to the same temperature as the moisture condensed adjacent the cold wall. It is preferred to have the thermostat actuate or open the drain valve when the temperature of the insulation rises to a point at or above the freezing temperature of water. When this temperature is reached the moisture which has frozen within the insulation will melt and a large amount of water will be drained to the bottom portion of the spaced walls. This being the time at which the greatest volume of water is collected, it is preferred to have the discharge valve open at this time. The spaced side walls of the refrigerated truck have a bottom floor on which the insulation usually rests. According to my invention the insulation is supported above this floor and in spaced relation thereto by a perforated support which allows the water draining down from the insulation to collect until it is discharged by the automatically operated valve. Preferably the insulation between the spaced side walls of the truck in which the insulation is placed extends downwardly below the floor of the refrigerated space and the support for the insulation is substantially removed from the colder part of the refrigerated space. Thus the space into which the water is drained and collected is not subjected to freezing temperature. Also the insulation is kept more free from water since the water is drained from the bottom thereof into the collection space. The discharge valve is usually under water when it is closed, and if the water in this space were frozen, due to the heat lost to the refrigerated space, it would be difficult to operate the valve until the ice had melted again. The location of the thermostats at a point where it is subject to the temperature in the refrigerated space is advantageous in that the valve is automatically closed when the truck is cooled down by a refrigerant which may be dry ice or some other refrigerant or may be a mechanically operated refrigerating system having evaporator oils in the refrigerated space.

It is a primary object of this invention to provide a new method and apparatus for removing condensed moisture from an insulation space provided by spaced walls enclosing a refrigerated space.

It is another major object of this invention to provide a novel method and apparatus for automatically discharging the water condensed in the insulation surrounding a refrigerated space.

It is another object of this invention to provide a novel method and apparatus for removing condensed moisture from an insulated space surrounding a refrigerated space.

It is another object of this invention to provide a method and apparatus for automatically collecting and discharging water from an insulated space surrounding a refrigerated space in response to temperature variations within the refrigerated space.

It is another object of this invention to provide means for supporting insulation for a refrigerated space whereby condensed water may be drained from said insulation.

It is another object of this invention to provide a refrigerated vehicle having insulation in its walls, with means for draining condensed moisture from said insulation and automatically discharging said collected moisture at intervals.

It is another object of this invention to provide a method and apparatus for removing moisture from insulation in a refrigerated structure and preventing the freezing of such removed moisture before it is discharged.

Further objects will become apparent from the following specification and the accompanying drawings and from the appended claims.

In the drawings:

Figure 1 is a side elevation of a refrigerated truck body incorporating the automatic valves and insulation support of my invention.

Figure 2 is a partial view in section along the line 2—2 of Figure 1.

Figure 3 is a plan view of a section of the perforated support for the insulation.

Figure 4 is a side view of the support shown in Figure 3.

As shown in Figures 1 and 2, a refrigerated truck body 11 has spaced outer and inner side walls 12 and 13. The space between these walls is filled with insulating means 14, which may be of a fibrous or cellular material or which may be of the type comprising a number of spaced metallic surfaces. In Figure 2 the insulating material 14 is shown as being of a fibrous or cellular material in two layers with their surfaces meeting at 15.

The side walls of the truck body are interrupted by a wheel housing 16 on each side of the body as shown in Figure 1. The bottom of the truck body comprises a plywood floor 17 extending between the outer side walls 12. Spaced above this floor, and resting thereon in the space between the inner and outer side walls, is an insulation support 18 having perforations 19 therein and supported above the floor by down-turned flanges or legs 21 which are preferably continuous. This insulation support provides a means separating or spacing the insulating material between the spaced side walls from the floor 17. A drainage compartment 20 is thereby formed in which compartment water draining from the insulation is collected.

The floor 17 has a plurality of openings 25 for discharging water collected below the perforated support. The perforated support 18 and the compartment 20 formed thereby are preferably continuous from the back of the truck underneath the insulation in both side walls and underneath the insulation between the spaced front walls of the body. Where the side walls and plywood floor 17 are interrupted by the wheel housing 16 the insulation support 18 can be of curved form to space the insulation above the wheel housing.

Thermostatic valves 24, the operation of which will be described later, provide closures for the openings 25, and these openings are preferably located on both sides of the wheel housing. That is, valves should be located between the wheel housing and the back of the body and another thermostatic valve controlling an opening 25 should be provided to drain the side walls and the front wall of the truck which are forward of the wheel housing. This single valve is preferably beneath the insulation in the front of the body as shown in Figure 1. It is to be understood that any number of these valves may be used, depending upon the size of the body, the number of irregularities such as wheel housings 16, etc.

The floor of the refrigerated truck body is built up of several elements comprising the plywood floor 17, layers of cork bord 29, a floor pan 26, and load carrying slats 27. The floor pan 26 is preferably metallic and has the slats 27 integral with or lying on top of it and running lengthwise of the truck from the front to the back thereof.

The outer side walls 12 preferably extend downward a short distance below the plywood floor 17 as shown in Figure 2. The inner side wall 13 and the corresponding inner front wall 23 extend downwardly until they meet a turned up portion 31 of the floor pan 26, the turned up portion 31 constituting a continuation of the inner side wall 13 of the level of the floor pan. A member 32 is fastened adjacent the bottom of the inner side wall 13 and together with said side wall forms a groove or slot into which the upper edge of the turned up flange 31 is inserted. Below the floor pan 26 the side of insulation material 14 abuts against the cork board 29. The joint between the insulation material and the cork board is preferably sealed with a waterproof compound. In a similar manner a waterproof seal is provided between the corkboard and the underside of the floor pan 26.

As shown in Figure 2, a metallic housing 33 encloses the thermostat 34 and valve stem 42 of the thermostatic valve 24. This housing 33 extends through the opening 25, compartment 20, and up into the insulation 14 to a point substantially at the level of the floor pan 26. The bottom of the housing terminates in, or is suitably attached to, a flange 36 surrounding opening 25 and providing means whereby the whole thermostatic device can be fastened in place, as by screws 38 which secure the flange to the plywood floor 17.

The flange 36 also extends inwardly to provide an opening 39 controlled by a valve 41 which seats on a valve seat 43 surrounding the opening. A valve stem 42 connects the valve to the thermostatic element 34, the stem being guided by a valve guide 44 adjacent the bottom end of the housing 33.

In order to permit water from compartment 20 to flow into the housing 33, to be discharged through opening 39, the walls of the housing 33 are provided with one or more openings 45 extending above and below the top surface of the plywood floor.

The thermostatic element 34 is of the type which contracts when cold and expands when heated so that the stem 42 will be moved downwardly when the thermostatic element is warm and will move upwardly when it is cold. Movement of the valve stem opens and closes the opening 39, to discharge water collected below the support and to close the opening against the admission of air when the thermostatic element is cold.

It is to be understood that means may be incorporated in the thermostatic valve whereby its opening temperature can be regulated. This may take the form of means for adjusting the length of the valve stem, or means for adjustably positioning the valve 41 on the stem 42, etc.

The thermostatic valve can be easily removed as a unit, for adjustment, cleaning, or repairs by removing the screws 38.

An L-shaped flange 47 overlaps the end of the plywood floor 17 adjacent the outer side wall 12 and is joined to a Z-shaped flange 46 between the outer legs of the insulation support 18 and the outer side wall 12. The Z-shaped flange 46 provides a space between the insulation, a support leg 21 and the outer side wall 12, which is filled with a waterproof material 48 preventing the passage of moisture between the support leg 21 and the outer side wall 12. One leg of the Z-shaped flange 46 extends over the floor 17 and provides a rest for the support leg 21.

A waterproof seal 48 is also provided between the floor plan 26 and the cork board 29, between the cork board and the insulation 14, in the space between the Z member 46, insulation 14 and the leg 21, and over the floor 17 in the compartment 20.

The construction and arrangement of the insulation, support, thermostatic valve 24, etc., between the outer front wall 22 and the inner front wall 23, are the same as that shown in Figure 2 which is a section along the line 2—2 of Figure 1.

The present invention provides means whereby water is drained from the insulation and is collected at a point which will be kept at a temperature above the freezing point of water from which point it is automatically discharged at intervals.

Practically all refrigerated housings of any sort are operated under conditions such that there are periods during which the housing is not cold. In the case of refrigerators which use ordinary ice or dry ice there are fluctuations in the temperature of the box due to changes in atmospheric pressure and temperature, and due to the varying amount of refrigerant in the box. With the present invention the moisture which has been condensed and in some cases frozen within the insulation is provided with an exit into a chamber where it will have no harmful influence on the insulating material. In such cases the thermostat can be designed to operate at any desired temperature to open the valve and discharge the water. Subsequent changes in temperature, wherein the refrigerator is cooled again will cause the valve to close and prevent as much as possible the free entrance of air into insulation space again.

In the case of a mechanically refrigerated structure, such as a household refrigerator or a refrigerated truck body, or freight car, etc., there occur periods when the evaporator coils in the refrigeration chamber must be defrosted. During the defrosting period the temperature within the refrigerated space is raised by a substantial amount. At these times when the temperature is raised the automatic valve will operate to discharge the collected water. Furthermore, it is apparent that any moisture which has frozen within the insulation during the cooling period will be melted and flow into the compartment 20 during the defrosting periods. These are the periods when there is the greatest likelihood of there being a large amount of water discharged into the compartment 20. With the novel arrangements in my invention the discharge valve will be open at this time. Furthermore, in the case of the refrigerated truck bodies, whether they are of the type carrying a natural refrigerant or a mechanical refrigerated means, there are times when the trucks are not refrigerated because they are not being used. At such times they will warm up and the water discharge openings will be open. My novel perforated support for the insulation between the spaced walls prevents the bottommost portion of the insulation being continuously wet as would be the case if the insulation extended completely to the plywood floor 17. Furthermore, by the provision of this perforated support only a small number of automatic discharge valves are needed because the water can flow along the compartments 20 until it reaches a discharge valve. It is to be understood that if only three discharge valves are used as shown in Figure 1, the compartments 20, between the side walls, and similar compartments between the two front spaced walls must be connected at the front corners of the body. Of course, it is contemplated that more than one discharge valve may be used forward of the wheel housing, especially in the case of a long truck body where it would be preferable to have more than one such discharge valve.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of draining water from the insulation in the walls of a refrigerated housing which comprises maintaining the bottom of said insulation in open communication with a compartment in the lower part of said walls; draining water from said insulation into said compartment and automatically discharging said water from said compartment in response to temperature changes in said housing.

2. The method of draining water from the insulation in the walls of a refrigerated housing which comprises passing water from said insulation into a compartment in the lower part of said walls; maintaining said compartment at a temperature above that of the freezing point of water; and automatically discharging said water at intervals.

3. The method of draining water from insulation in the walls of a refrigerated housing which comprises passing water from said insulation into a compartment in the lower part of said walls remote from said refrigerated housing; and automatically discharging said water in response to temperature changes in said housing.

4. An apparatus for draining water from the insulation in the walls of a refrigerated housing which comprises means for collecting water drained from said insulation into a lower part of said walls; and means for automatically discharging said collected water at intervals.

5. An apparatus for draining water from the insulation of a refrigerated housing which comprises means for collecting said water in a part of said housing; and means responsive to temperature variations in said housing for discharging said collected water.

6. A refrigerator housing comprising spaced walls; insulation within said spaced walls; a compartment below said insulation; means for maintaining the bottom of said insulation in open communication with said compartment and draining water from said insulation; means for collecting said water in said compartment; and means for automatically discharging said water from said compartment at intervals.

7. In combination with spaced external and internal walls of a refrigerator, said internal walls forming a cooling chamber and being spaced from said external walls to form an insulation space; insulating means within said space; a bottom wall between said spaced walls and provided with a discharge opening; a perforate support spaced above said bottom wall for supporting said insulation and providing a compartment therebelow; and automatic valve means closing said discharge opening.

8. In combination with spaced side walls forming an insulating space for a refrigerating chamber; insulating means within said space; a bottom wall between said side walls, said wall being provided with a discharge opening; a perforate support for said insulating means, said support being spaced from said bottom wall to provide a chamber below said insulation; and automatic valve means for controlling said discharge opening in response to temperature changes within said refrigerating chamber.

9. In a refrigerating device, an outer casing and an inner lining having insulation material therebetween, said outer casing being provided with a water discharge opening in a bottom part thereof; a valve closing said opening; and thermostatic means responsive to the temperature in said refrigerating device for opening said valve.

10. A storage device comprising a compartment having bottom and side walls; outer walls spaced from said side walls to provide an insulation space, said outer walls extending below said bottom wall; means providing a discharge opening in said bottom wall; a valve closing said discharge opening; and a thermostat adjacent said bottom wall and connected to operate said valve in response to temperature changes in said compartment.

11. A storage device comprising a compartment having bottom and side walls; outer walls spaced from said side walls to provide an insulation space, said outer walls extending below said bottom wall; means providing a discharge opening in said bottom wall; insulating means between said side walls; a perforated means spaced from said bottom wall for supporting said insulating means above said floor and providing a water compartment therebetween; a valve closing said discharge opening; and a thermostat adjacent said bottom wall and connected to said valve for controlling the discharge from said water compartment in response to temperature changes in said compartment.

12. In a refrigerated vehicle body having spaced side walls providing a space for insulation, a bottom wall provided with a discharge opening; a perforated insulation support having depending flanges for spacing said insulation above said bottom wall; and insulation in the space between said side walls and resting on said support.

13. In a refrigerated vehicle body having spaced side walls providing a space for insulation and a bottom wall; insulating means within said space; a perforated insulation support having depending flanges for spacing said insulation above said bottom wall and forming a water compartment therebetween; and means for discharging water from said compartment.

14. A support for spacing insulation above the floor of an insulated wall structure comprising a perforated member having depending flanges for supporting said member above said floor.

15. In a refrigerated vehicle body having a front member and side members and a floor interrupted by wheel housings, spaced walls forming said members and providing a space for insulation; a perforated support above said floor; insulating means resting on said support; and means providing outlets below said support.

16. The apparatus defined in claim 15 wherein said last mentioned means are provided on both sides of said wheel housings.

17. The apparatus defined in claim 15, and thermostatic means controlling said outlets in response to temperature changes within said vehicle body.

18. The method of removing condensate from insulating material disposed between spaced walls of a refrigerated housing, which comprises draining said condensate from the upper part into the lower part of the space between said walls; collecting said condensate in said lower part; and automatically discharging said collected condensate at intervals.

19. The method of removing water from the insulation of a refrigerated housing which comprises draining water from the upper part of the insulation; collecting said water in a lower part of said housing; and discharging said collected water in response to temperature variations in said housing.

20. In a refrigerating device, an outer casing and an inner lining having insulation material therebetween; said outer casing being provided with means in a bottom part thereof for discharging water drained from the insulation and operable in response to changes in the temperature of said refrigerating device.

21. In a refrigerating device, spaced substantially vertical walls having insulating material disposed therebetween, a condensate discharge valve in the lower part of the space between said walls positioned to communicate with collected condensate drained from said insulating material, and means responsive to the temperature of said refrigerating device for controlling operation of said valve to discharge collected condensate.

GEORGE E. MUMA.
LEONEL A. DE MORE.